(12) United States Patent
Liao et al.

(10) Patent No.: US 9,074,761 B2
(45) Date of Patent: Jul. 7, 2015

(54) COMPOSITE TABLE LIGHTING STRUCTURE FOR WIRED CHARGING AND WIRELESS CHARGING

(71) Applicants: Wen-Yung Liao, Taipei Hsien (TW); Wen-Fu Liao, Taipei Hsien (TW); Sheng-Hsin Liao, Taipei Hsien (TW)

(72) Inventors: Wen-Yung Liao, Taipei Hsien (TW); Wen-Fu Liao, Taipei Hsien (TW); Sheng-Hsin Liao, Taipei Hsien (TW)

(*) Notice: Subject to any disclaimer, the term of this patent is extended or adjusted under 35 U.S.C. 154(b) by 0 days.

(21) Appl. No.: 14/084,789

(22) Filed: Nov. 20, 2013

(65) Prior Publication Data

US 2014/0078741 A1    Mar. 20, 2014

Related U.S. Application Data

(62) Division of application No. 12/940,229, filed on Nov. 5, 2010, now abandoned.

(51) Int. Cl.
*H02J 7/00* (2006.01)
*F21V 33/00* (2006.01)

(52) U.S. Cl.
CPC ............ *F21V 33/0052* (2013.01); *H02J 7/0042* (2013.01)

(58) Field of Classification Search
CPC ..... H02J 7/0044; H02J 7/0045; H02J 7/0042; Y02E 60/12; H01M 10/46
USPC .......................................................... 320/115
See application file for complete search history.

(56) References Cited

U.S. PATENT DOCUMENTS

| | | | |
|---|---|---|---|
| 7,579,809 B2 * | 8/2009 | Bowles et al. | 320/107 |
| 2012/0019207 A1 * | 1/2012 | Kuo et al. | 320/111 |
| 2014/0091765 A1 * | 4/2014 | Law | 320/111 |

* cited by examiner

*Primary Examiner* — Arun Williams
(74) *Attorney, Agent, or Firm* — Rosenberg, Klein & Lee (57) ABSTRACT

A charging device and associated electrical appliances are provided. More than one electronic device can be charged simultaneously, with a wireless charging option available. Thus, the user has greater flexibility in selecting the desired charging option. Each associated appliance has a receiving compartment to hold the charging device, and the receiving compartment is configured with at least one first terminal. The charging device has at least one electrical interface for cable connection, a wireless charging transmitter, and at least one second terminal for mating electrically to the first terminal.

6 Claims, 9 Drawing Sheets

COMPOSITE TABLE LIGHTING STRUCTURE FOR WIRED CHARGING AND WIRELESS CHARGING

REFERENCE TO RELATED APPLICATION

This Application is being filed as a Divisional Application of patent application Ser. No. 12/940,229, filed Nov. 5, 2010, currently pending.

BACKGROUND OF THE INVENTION

1. Field of the Invention

The instant disclosure relates to a charging device and associated electrical appliances; in particular, a charging device and associated composite power strip, composite wall outlet assembly, and composite lighting structure.

2. Description of the Related Art

Utility power is often accessed through wall sockets. When portable electronics such as mobile phones, digital cameras, and PDAs (Personal Digital Assistant) need to be recharged, a charger is plugged into an electrical outlet to charge the mobile devices.

However, the use of cables can cause inconvenience to the users. Wireless charging would eliminate the need for cable connections.

In the Taiwan Publication No. 592378, titled "Universal Serial Bus Transformer", the inventor previously disclosed a transformer that supplies standard power source. The user would not require to purchase device-specific transformers. However, the transformer can not perform wireless charging.

To resolve the above shortcoming, the inventor proposes the following solution.

SUMMARY OF THE INVENTION

The object of the instant disclosure is to provide a charging device and associated electrical appliances, where charging can be performed using cable connection and wireless method.

To achieve the above object, the instant disclosure provides a composite power strip, which includes a housing having a body, which has at least one electrical outlet, where the electrical outlet is wired to a power source, and a receiving compartment is formed upon the body, with the receiving compartment having at least one first terminal; and a charging device having at least one electrical interface, a wireless charging transmitter, and at least one second terminal, where the charging device is removably attached to the receiving compartment, with the second terminal connecting electrically to the first terminal.

The instant disclosure also provides a composite wall outlet assembly, which includes a housing having a body, with at least one electrical outlet positioned thereupon, where a receiving compartment is defined by the body, and the receiving compartment has at least one first terminal; and a charging device having at least one electrical interface, a wireless charging transmitter, and at least one second terminal, where the charging device is removably attached to the receiving compartment, with the second terminal connecting electrically to the first terminal.

The instant disclosure further provides a composite lighting structure. The composite lighting structure has a base, which defines a receiving compartment having at least one first terminal; a light source attached to the base; and a charging device having at least one electrical interface, a wireless charging transmitter, and at least one second terminal, where the charging device is removably attached to the receiving compartment, with the second terminal connecting electrically to the first terminal.

The instant disclosure still further provides a charging device having at least one electrical interface, a wireless charging transmitter, and at least one first terminal.

The instant disclosure presents the following advantages. First, the charging device can charge one or more electronic device via the electrical interface, and also provides wireless charging to an electronic device having a wireless charging receiver. Second, a bad charging device can be discarded from the electrical appliance body for replacement purpose. Similarly, the wireless charging transmitter can be replaced separately from the charging device also. For cost-effectiveness, the electrical appliance itself can be saved by only replacing the bad charging device or transmitter.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
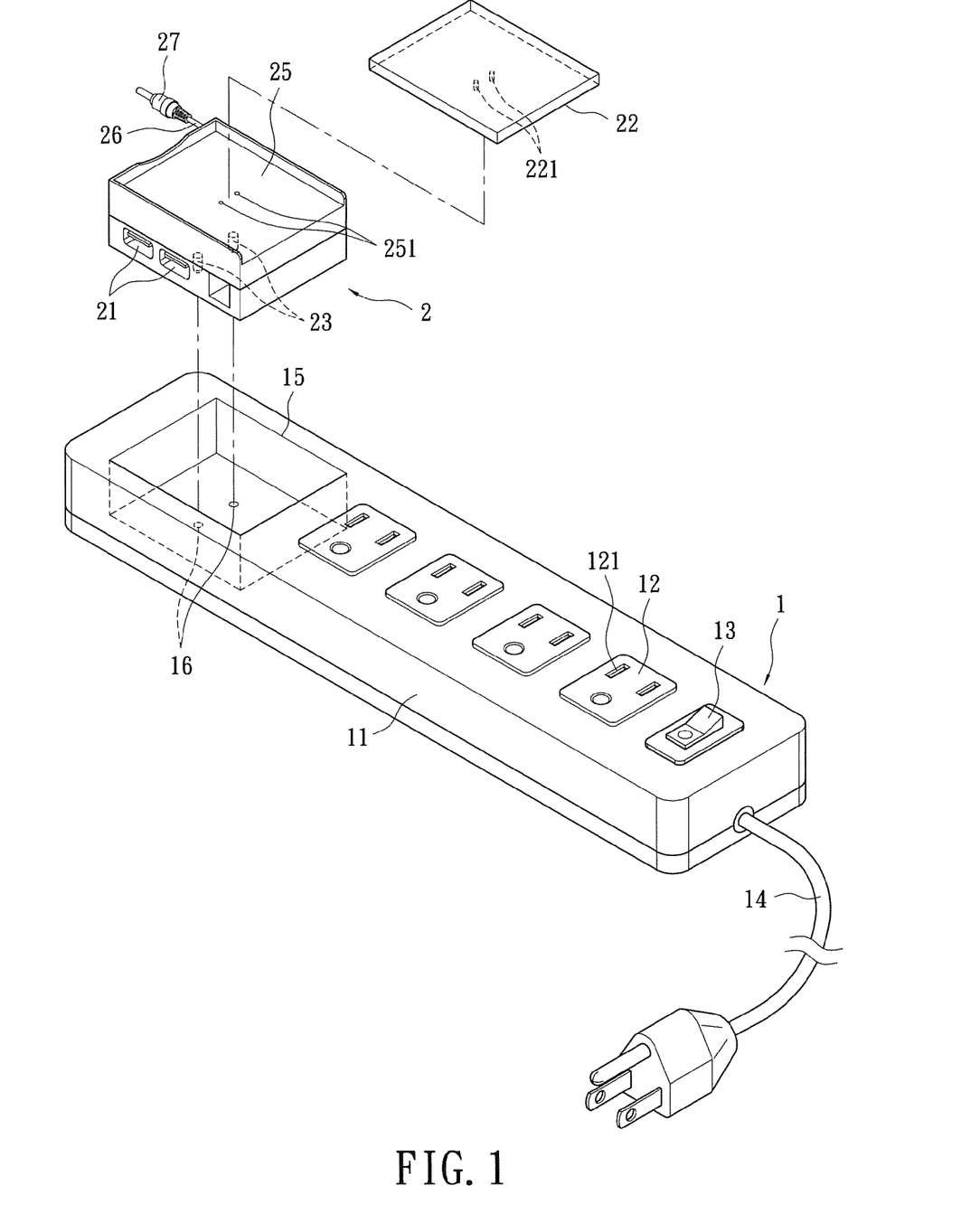
FIG. 1 shows an exploded view of a composite power strip of the first embodiment.
Figure 2:
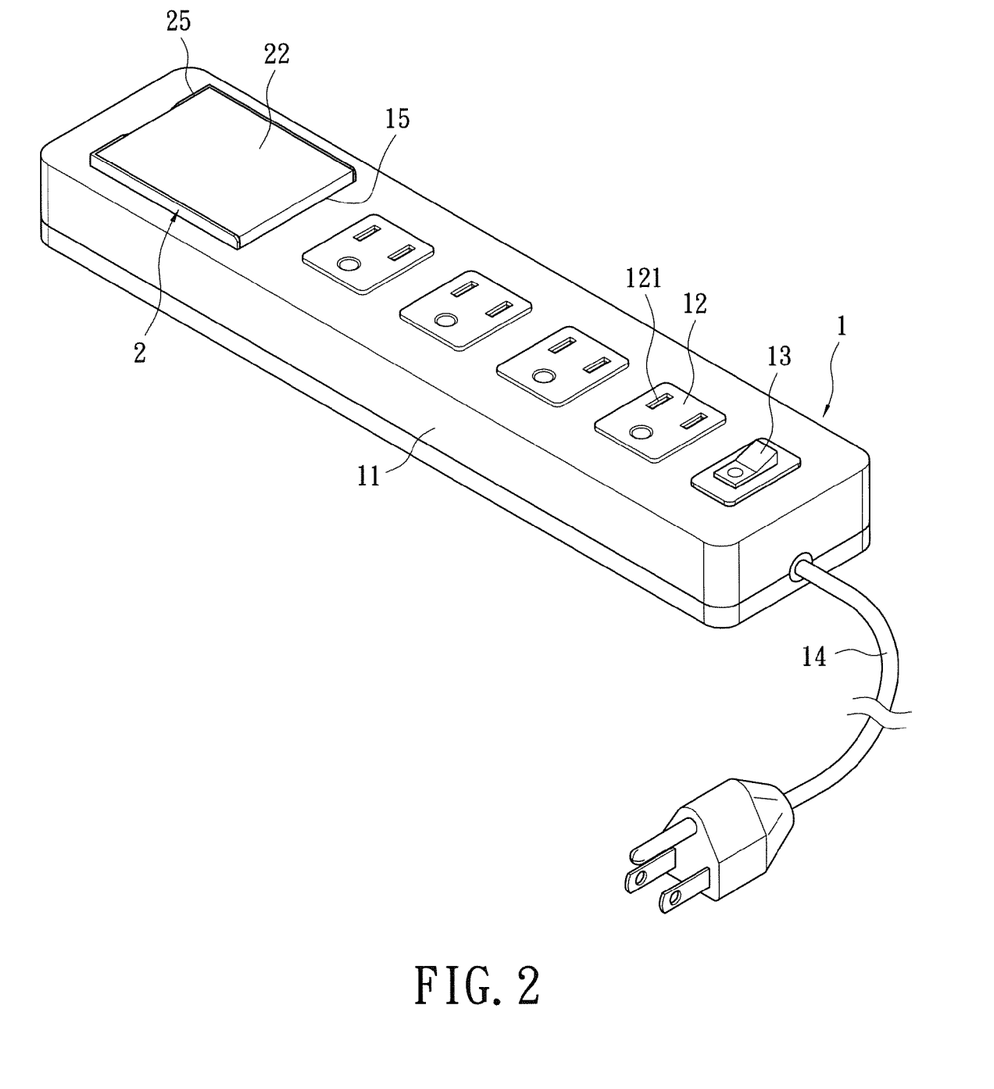
FIG. 2 shows an isometric view of a composite power strip of the first embodiment.

For the first embodiment shown in FIGS. 1 and 2, a composite power strip has a housing 1, which includes a body 11 having at least one electrical outlet 12 and an on/off switch 13. The electrical outlet 12 has slots 121 and a conductive strip therein (not shown). The electrical outlet 12 is not restricted in type and can be any electrical connector. A power cord 14 is electrically connected to the electrical outlet 12 for propagating electrical current from the power source to the electrical outlet 12. A charging device 2 is removably attached to a receiving compartment 15 formed upon the body 11. The receiving compartment 15 is sized according to the dimensional aspect of the charging device 2. The receiving compartment 15 has at least one first terminal 16 for mating electrically to an at least one second terminal 23 on the charging device 2. The first terminal 16 can be located on the side or bottom surface of the receiving compartment 15 and is connected electrically to the power cord 14. Thereby, the charging device 2 can connect electrically to the interior electrical circuitry of the housing 1 and receive the power accordingly.

Figure 3:
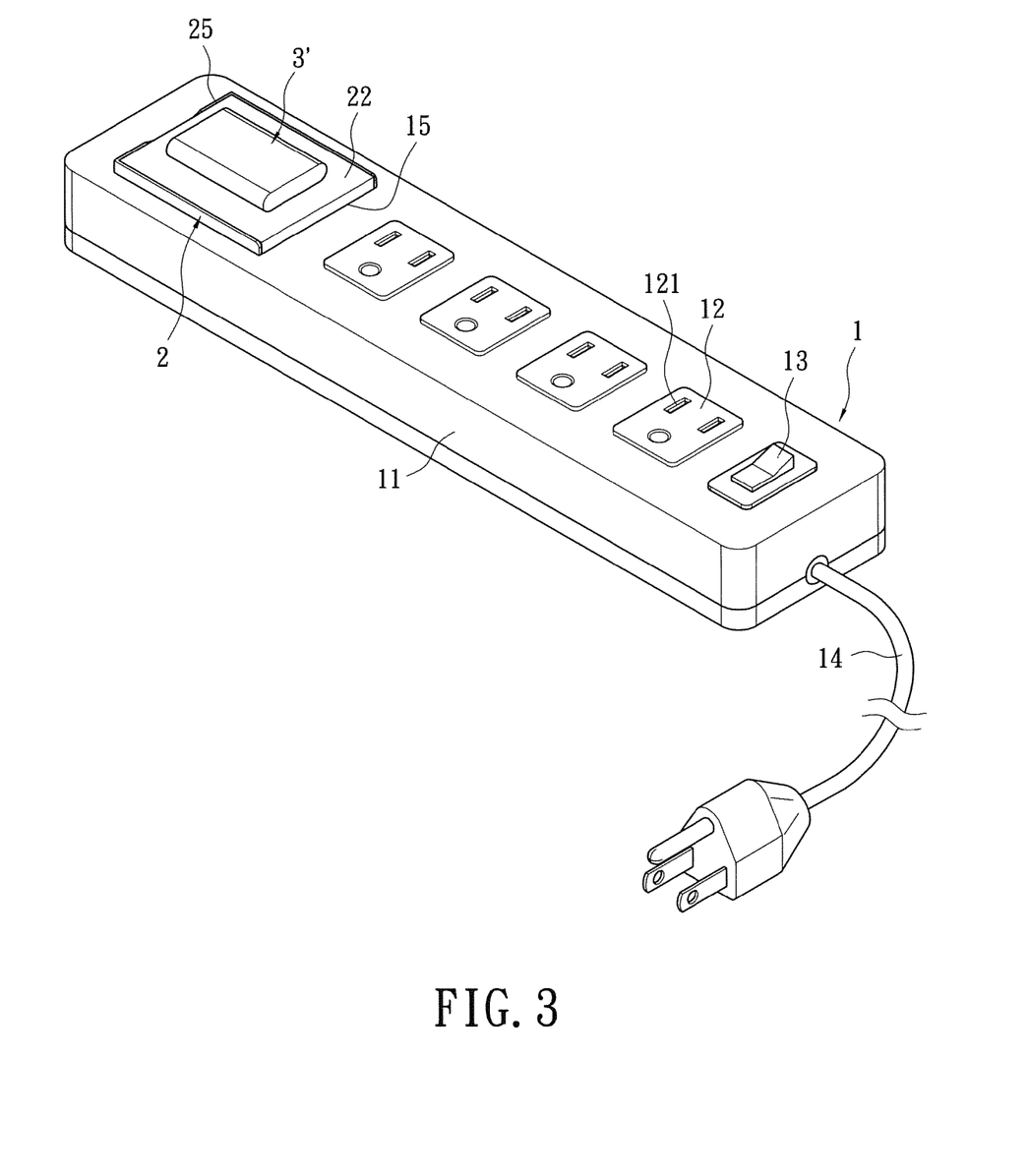
FIG. 3 shows a schematic view of a composite power strip in use of the first embodiment.

As depicted in FIG. 1, the charging device 2 of the instant disclosure has at least one electrical interface 21 for charging using cable connection and a transmitter 22 for charging wirelessly. Among others the electrical interface 21 can be a USB connector, IEEE 1394 connector, HDMI connector, A/V connector, or DC connector. Meanwhile, the charging device 2 has a square-shaped body, but can alternatively be formed in many shapes and sizes according to the operation requirement. As shown in FIGS. 1 to 3, the charging device 2 has a recess 25 for receiving the removable transmitter 22. The transmitter 22 and the recess 25 have a first and second electrical contact 221 and 251 respectively. The first electrical contact 221 can connect electrically to the second electrical contact 251, thus allowing the transmitter 22 to be electrically connected to the internal electrical circuitry of the charging device 2. The charging device 2 can further includes a retrievable cord 26 having a power connector 27 on the free end. A built-in transformer, signal light, sensor, timer, or GCFI (ground fault circuit interrupter) may also be included in the charging device 2.

Notably, the transmitter 22 can also be integrally fixed to the charging device 2 as depicted in FIGS. 4, 5, 7, 8, and 9.

Figure 6:
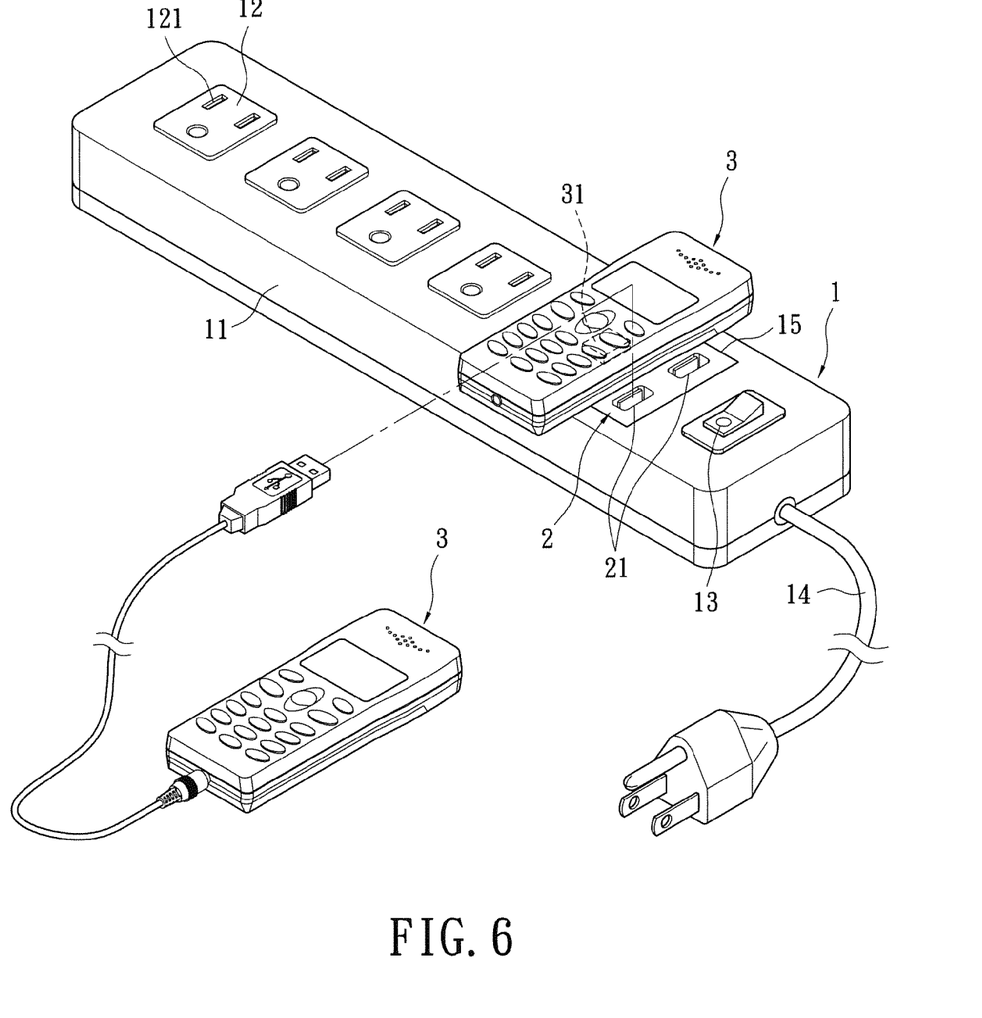
FIG. 6 shows a schematic view of a composite power strip in use of the second embodiment.

In use, a battery 3' having a charging receiver can be placed on the charging device 2 as depicted in FIG. 3. Then, the battery 3' is charged via electromagnetic induction, cord- and wire-free. FIG. 6 shows another example, where an electronic device 3, such as a mobile phone, can be recharged by connecting electrically to the electrical interface 21 via a connection cable. On the other hand, if the mobile phone includes a charging receiver 31, the mobile phone can be placed on the charging device 2 for charging wirelessly.

Figure 4:
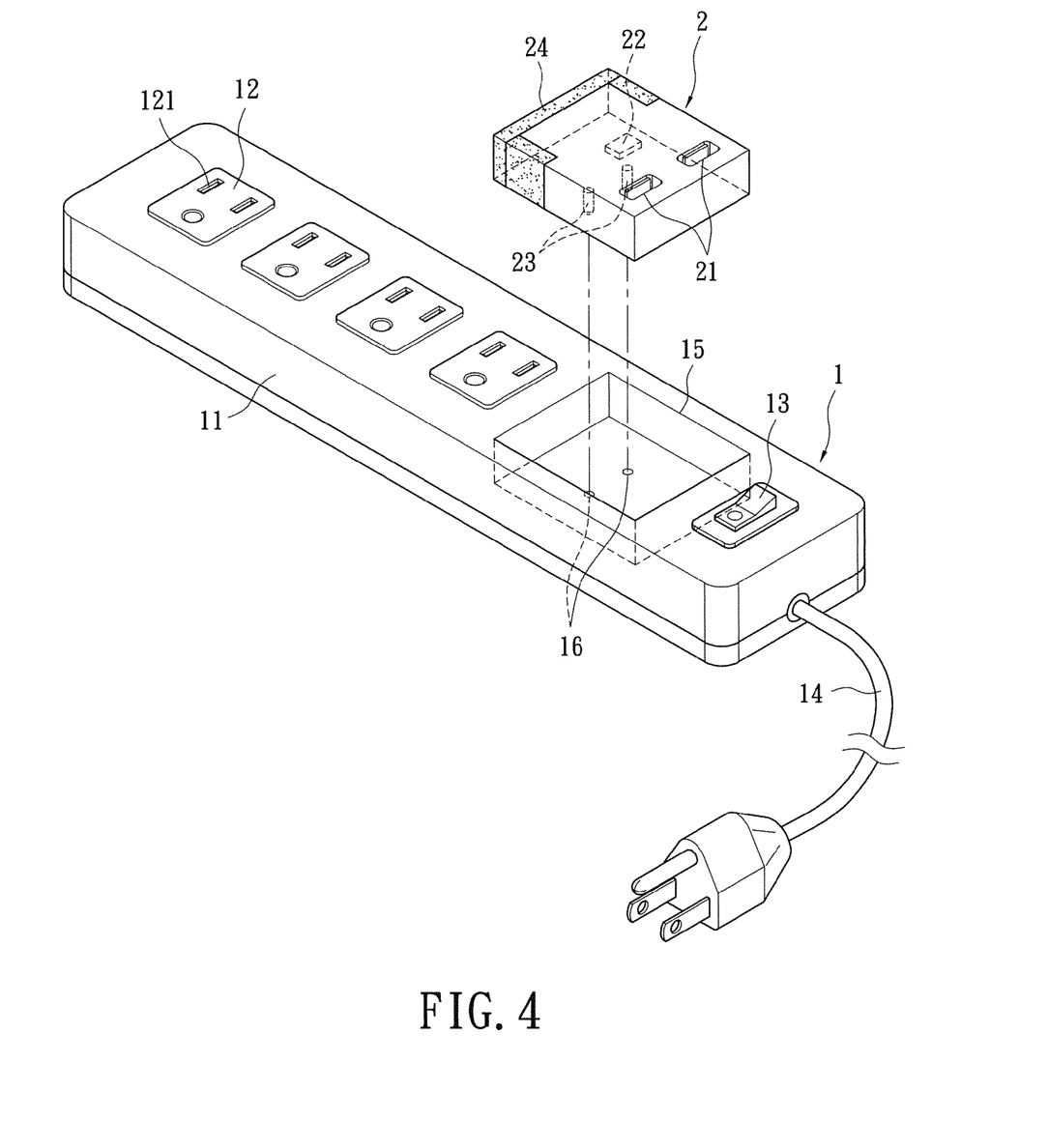
FIG. 4 shows an exploded view of a composite power strip of the second embodiment.
Figure 5:
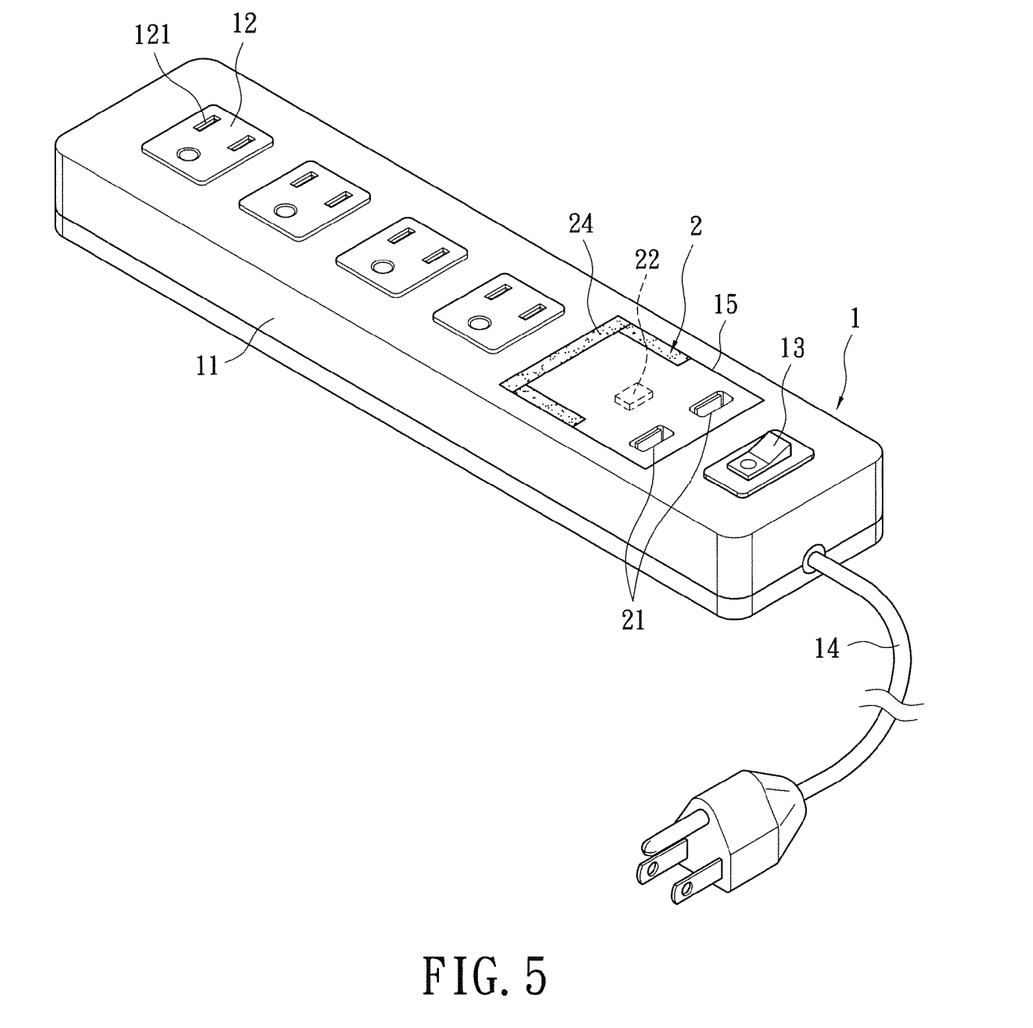
FIG. 5 shows an isometric view of a composite power strip of the second embodiment.

To secure the electronic device on the charging device 2 while charging, the charging device 2 can further include at least one magnetic member 24 as shown in FIGS. 4 and 5 for a second embodiment. While the electronic device is placed on the charging device 2, the magnetized charging device 2 will attract the electronic device having an outer casing made of magnetic material to better secure the electronic device while charging.

Figure 7:
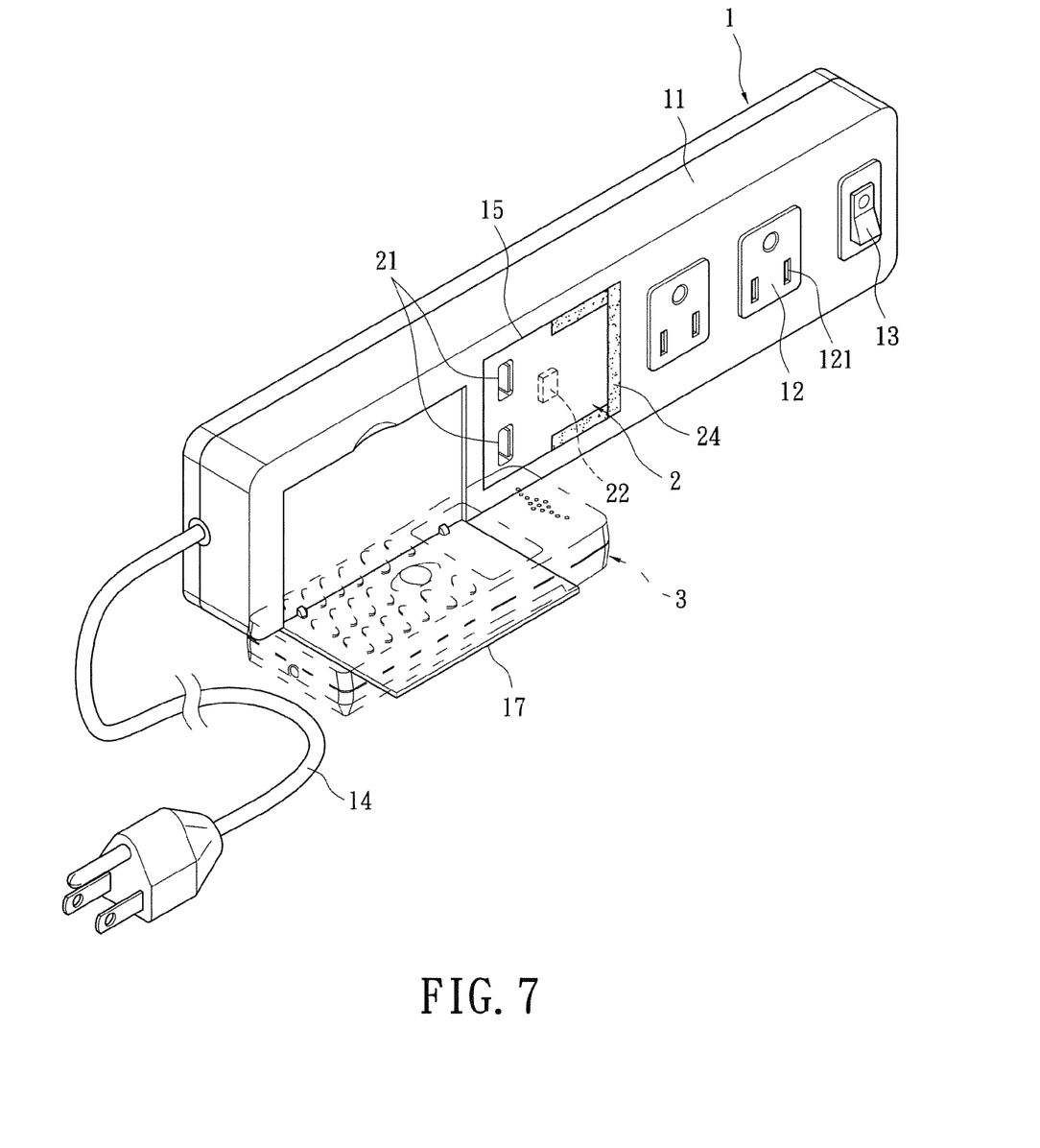
FIG. 7 shows an isometric view of a composite power strip of the third embodiment.

In a third embodiment as shown in FIG. 7, the power strip can further include a support plate 17. Namely, the body 11 of the housing 1 comprises the hinged support plate 17 that radially releases for resting the electronic device 3.

Figure 8:
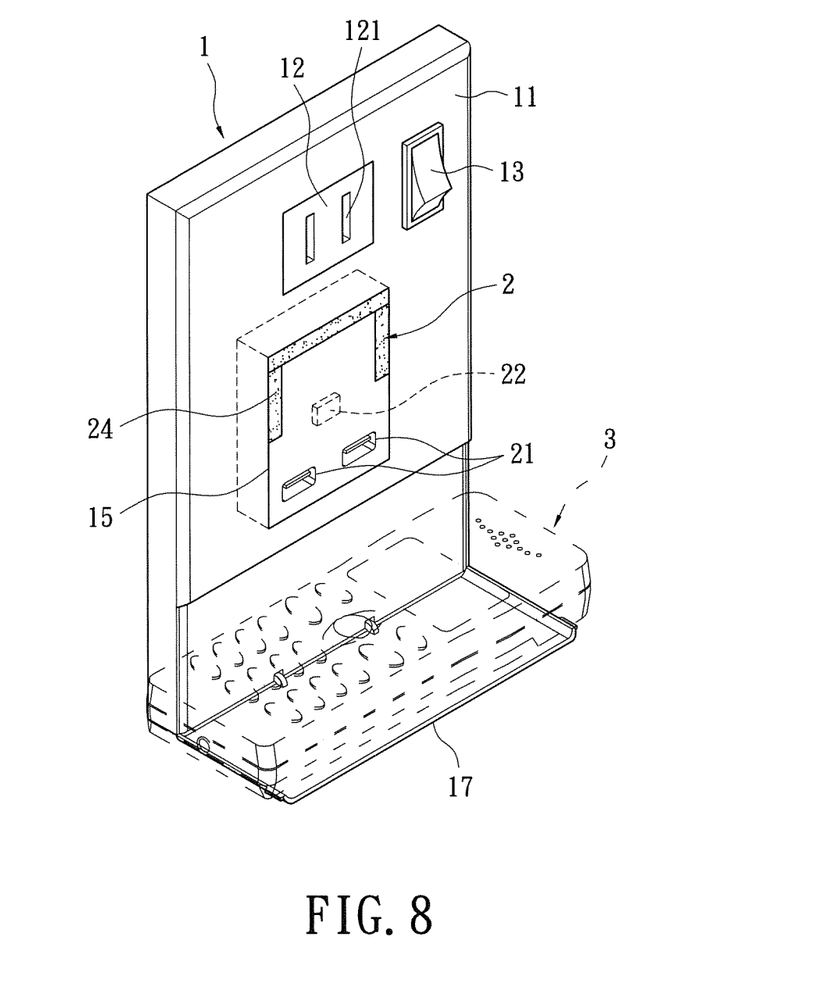
FIG. 8 shows an isometric view of a composite wall outlet assembly of the fourth embodiment.

In a fourth embodiment, as shown in FIG. 8, the instant disclosure provides a composite wall outlet assembly having a charging device 2. For the composite wall outlet assembly, the body 11 of the housing 1 is rectangular-shaped, but can alternatively be formed in any shape. The body 11 is made of one or more plate and secured to the wall. The body 11 can also include a hinged support plate 17 that radially releases for resting the electronic device 3.

Figure 9:
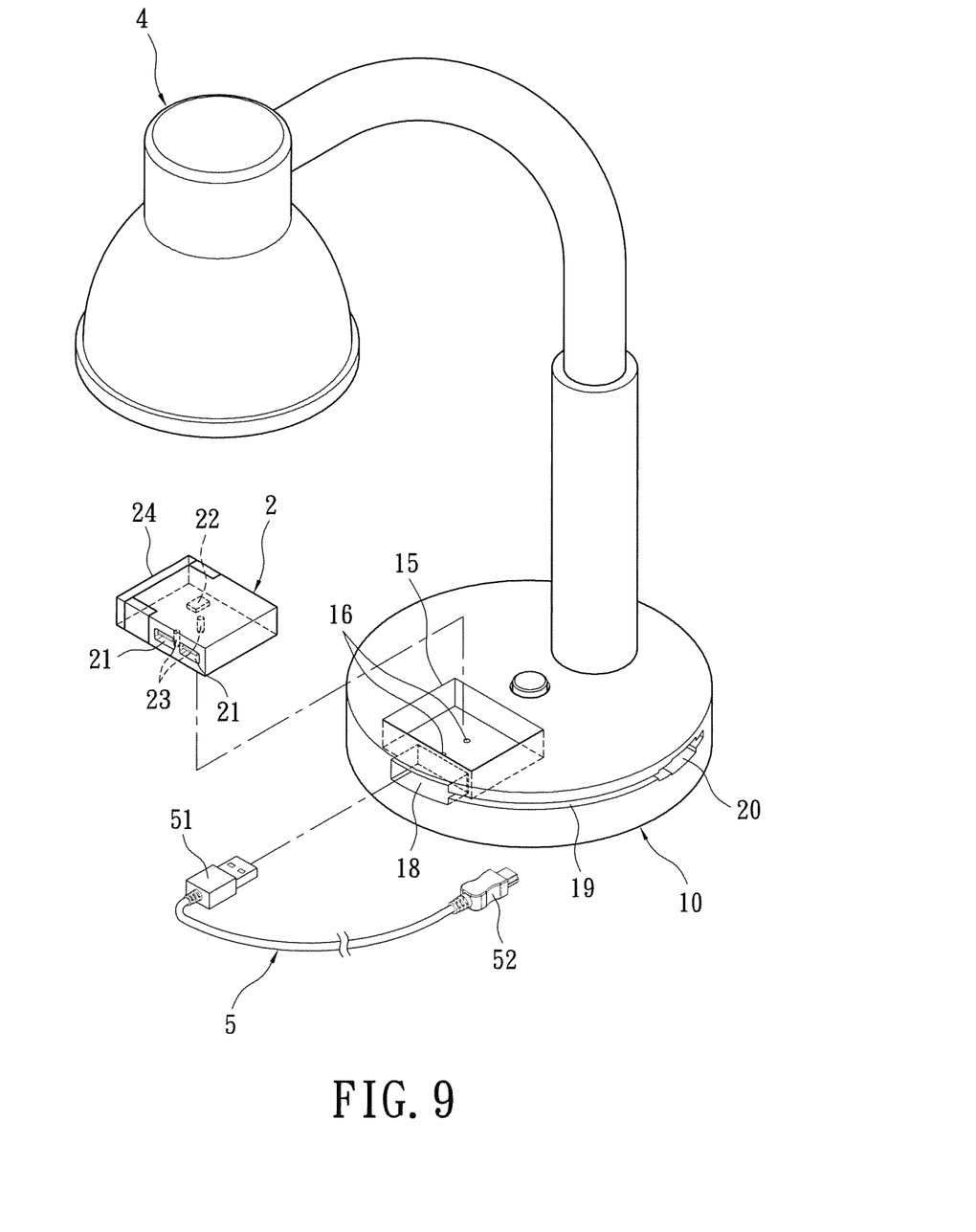
FIG. 9 shows an exploded view of a composite lighting structure.

In referring to FIG. 9, the instant disclosure further provides a composite lighting structure having a charging device 2. The composite lighting structure comprises a base 10 and a light source 4, where a receiving compartment 15 is formed on the base 10 to accommodate the charging device 2, and the receiving compartment 15 has at least one first terminal 16. The charging device 2 of the instant disclosure has at least one electrical interface 21 for charging using cable connection and a transmitter 22 for wireless charging option. The electrical interface 21 can be a USB type connector, while the transmitter 22 can be dislodged from the charging device 2 for replacement purpose. The charging device 2 further includes an electrical circuitry that is electrically connected to the electrical interface 21 and the transmitter 22, along with at least one second terminal 23 for mating electrically to the first terminal 16 of the receiving compartment 15. As described earlier, the charging device 2 can further includes at least one magnetic member 24 to help secure the electronic device while charging.

In addition, to provide more secured connection while charging using a cable 5, the base 10 further has a receiving space 18 positioned near the edge. The cable 5 is connected to a first connector 51 on one end and a second connector 52 on the other end. To charge an electronic device, the first connector 51 of the cable 5 is inserted into the receiving space 18 and electrically connected to the electrical interface 21 of the charging device 2. Meanwhile, the second connector 52 of the cable 5 is electrically connected to the electronic device, such as a mobile phone, for charging operation. Functionally, the receiving space 18 shelters the first connector 51 to protect the cable connection. Furthermore, slots 19 and 20 can further be formed on the base 10 for hiding the cable 5 and the second connector 52 while not in use.

In summary, the charging device 2 and associated electrical appliances of the instant disclosure provide charging using cable connection and wireless option. The option of using USB type connector for the electrical interface 21 offers a standard charging mode of using cable connection. Furthermore, more than one electronic device can be charged simultaneously for flexibility and convenience.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A composite table lighting structure for wired charging and wireless charging, comprising:
    a base having a receiving compartment, the receiving compartment comprises at least one first terminal;
    a light source connected to the base;
    a charging device having at least one electrical interface and a wireless charging transmitter, the charging device is removably attached to the receiving compartment and has at least one second terminal for connecting electrically to the first terminal;
    a cable having a first connector on one end and a second connector on another end;
    a receiving space formed on the base and communicated with the receiving compartment to accommodate and shelter the first connector when the first connector is plugged into the electrical interface through the receiving space so as to protect an electrical connection established between the first connector and the electrical interface; and
    a first slot and a second slot formed along an edge of the base, wherein the second slot and the receiving space are in communication with the first slot, and wherein a shape of the second slot is corresponding to that of the second connector to allow the second connector to fit securely in the second slot.

2. The composite table lighting structure for wired charging and wireless charging of claim 1, wherein the transmitter is removably attached to a recess on the charging device.

3. The composite table lighting structure for wired charging and wireless charging of claim 2, wherein the transmitter has a first electrical contact for mating electrically to a second electrical contact on the recess.

4. The composite table lighting structure for wired charging and wireless charging of claim 1, wherein the electrical interface is a USB type connector.

5. The composite table lighting structure for wired charging and wireless charging of claim 1, wherein the charging device further comprises an interior electrical circuitry, which is electrically connected to the electrical interface and the transmitter.

6. The composite table lighting structure for wired charging and wireless charging of claim 1, wherein the charging device further comprises at least one magnetic member.

* * * * *